US 6,732,399 B2

(12) United States Patent
Zimmer

(10) Patent No.: US 6,732,399 B2
(45) Date of Patent: May 11, 2004

(54) WIPER DEVICE AND METHOD FOR ADJUSTING THE BEARING FORCE OF A WIPER ARM

(75) Inventor: Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/089,619

(22) PCT Filed: Aug. 18, 2001

(86) PCT No.: PCT/DE01/03171

§ 371 (c)(1),
(2), (4) Date: Apr. 1, 2002

(87) PCT Pub. No.: WO02/32730

PCT Pub. Date: Apr. 25, 2002

(65) Prior Publication Data

US 2002/0133898 A1 Sep. 26, 2002

(30) Foreign Application Priority Data

Oct. 18, 2000 (DE) .......................................... 100 51 570

(51) Int. Cl.[7] ................................................. B60S 1/32
(52) U.S. Cl. ............................... 15/250.202; 15/250.351
(58) Field of Search ..................... 15/250.202, 250.351, 15/250.352, 250.34, 250.19

(56) References Cited

U.S. PATENT DOCUMENTS

| 2,289,552 | A | * | 7/1942 | Rousseau | ............... 15/250.202 |
| 3,366,989 | A | * | 2/1968 | Ludwig | .................. 15/250.202 |
| 5,369,740 | A | | 11/1994 | Naylor | ........................ 364/140 |

FOREIGN PATENT DOCUMENTS

| DE | 4033201 | * | 4/1992 | ............. 15/250.202 |
| EP | 0 935 337 A2 | | 8/1999 | |
| EP | 1 008 423 A2 | | 6/2000 | |
| FR | 2 720 708 A | | 12/1995 | |
| FR | 2 724 896 A | | 3/1996 | |
| GB | 2 215 148 A | | 9/1989 | |
| JP | 58-89441 | * | 5/1983 | ............. 15/250.202 |
| JP | 3-70653 | * | 3/1991 | ............. 15/250.202 |
| JP | 5-139255 | * | 6/1993 | ............. 15/250.202 |
| WO | 93 09980 A | | 5/1993 | |

* cited by examiner

Primary Examiner—Gary K. Graham
(74) Attorney, Agent, or Firm—Michael J. Striker

(57) ABSTRACT

Wiper apparatus and method, in particular for a motor vehicle, having a wiper arm (10) that is connectable to a wiper blade (13) on its one end (12) and, in the region of its other end (14), is connected to a tensioning element (22) that presses the one end (12) of the wiper arm (13) in the direction of a wiped surface (20) using a force F, whereby a calibrating element, in particular an eccentric bolt (30), is provided to adjust the force F.

11 Claims, 2 Drawing Sheets

WIPER DEVICE AND METHOD FOR ADJUSTING THE BEARING FORCE OF A WIPER ARM

BACKGROUND OF THE INVENTION

The invention concerns a wiper apparatus and a method for calibrating the contact force of a wiper arm.

Numerous wiper apparatuses for motor vehicles are already known in which a wiper blade attached to a wiper arm is pressed against the windshield of the motor vehicle with the aid of an extension spring to produce a wiper arm contact force. For this purpose, the wiper arm is attached in pivoting fashion to a rotary head using a hinge bolt, which rotary head is connected to the wiper shaft in torsion-proof fashion and makes an oscillating motion, for example. On the side facing the windshield, one end of the extension spring is thereby hooked in a bolt with one end at the wiper arm and with its other end on the rotary head. In such systems, the contact force can be varied or adjusted only by replacing the spring or one of the clamps holding the spring with another spring or another clamp.

SUMMARY OF THE INVENTION

The wiper apparatus has the advantage that the wiper arm contact force can be adjusted individually for any single wiper apparatus using an eccentric bolt as the calibrating element.

A relatively great deviation of contact forces between the individual wiper apparatuses in a series occurs as a result of tolerances of the spring rate and positional tolerances of the components that determine the arrangement of the spring and the spring preload itself. As a result of this, the mean contact force of all wiper apparatuses in a series must be specified such that a good wiping quality is also given when the contact force of the particular wiper apparatus moves on the margin of the tolerance range of the series. This is limited, on the one hand, by the wiper motor, because, due to its design, the contact force is used in the calculation linearly and, at maximum contact force—i.e., maximum friction force of the wiper blade element—the wiper motor must always remain capable of operating the wiper apparatus. On the other hand, the tolerance range is limited by the high-speed behavior. An acceptable wiping result must be achieved with a minimal contact force of the wiper arm and, therefore, the wiper blade, even at high speeds.

Using the calibrating element, a predetermined wiper arm contact force can be adjusted in very simple fashion, without using additional components or replacing them in entirety.

If one end of the wiper arm is connected to a rotary head in pivoting fashion, and the tensioning element between the wiper arm and rotary head is loaded, the contact force can be adjusted exactly, e.g., on a separate test stand, and the combination of rotary head, tensioning element and wiper arm can then installed on the wiper apparatus.

If the tensioning element on the rotary head is hooked around the eccentric bolt, it can be installed quickly, and it transfers the calibrating motion evenly.

In addition, if the tensioning element comprises at least one extension spring that is hooked around the eccentric bolt using a hook, then commercially-available, cost-effective extension springs can be used.

If the calibrating element comprises an external straight knurling for fixation purposes, then, in advantageous fashion, it cannot be twisted during operation as a result of the torque acting on the eccentric bolt, which would eliminate the calibration.

It is particularly advantageous if the calibrating element comprises a square socket or external square, a slit, or a cross recession for the calibration procedure. This is therefore easy to carry out using a commercially-available tool.

It is particularly advantageous, thereby, if the eccentric bolt is secured after turning. This can be accomplished, for example, by means of riveting, stamping, pressing or welding.

It is furthermore advantageous if the eccentric bolt comprises three cylindrical sections, whereby the two outer sections along its longitudinal extension comprise a coaxial centerline, and the center section comprises a centerline— axis-parallel, in particular—that differs from the coaxial centerline. In this fashion, it is not only possible to change the preload of the tensioning element, it is also possible to change the preload of the torque acting on the wiper arm, because the distance between the spring force that acts on the axis-parallel centerline and the hinging bolt is changed when the eccentric bolt is turned.

If the two outer sections have different diameters, the eccentric bolt is easier to insert during installation and it is secured against falling out, for example. It is also advantageous hereby, of course, if the bolt comprises a chamfer on at least one side.

If the eccentric bolt can be inserted in the bore of the rotary head and comprises a partial straight knurling along one of its two outer sections, it is advantageous if the center section of the eccentric bolt is designed so—in particular, is at least so wide—that the tensioning element can be hooked into the eccentric bolt without the straight knurling and bore being in contact. In this fashion, the eccentric bolt can be inserted into the bore during assembly, the tensioning element can be calibrated, and then the eccentric bolt can be prevented from turning by driving it home, because this creates a positive and non-positive connection between the bore and the eccentric bolt only after calibration is completed.

The advantage of the method —based on the invention— according to claim 1 is that a positive connection is achieved between eccentric bolt and rotary head without having to sacrifice the accuracy of calibration, because the eccentric bolt can be driven home in any angular position.

BRIEF DESCRIPTION OF THE DRAWINGS

An exemplary embodiment of the invention is shown in the drawings and described in greater detail in the subsequent description.

DETAILED DESCRIPTION OF THE PREFERRED EMBODIMENT

Figure 1A:
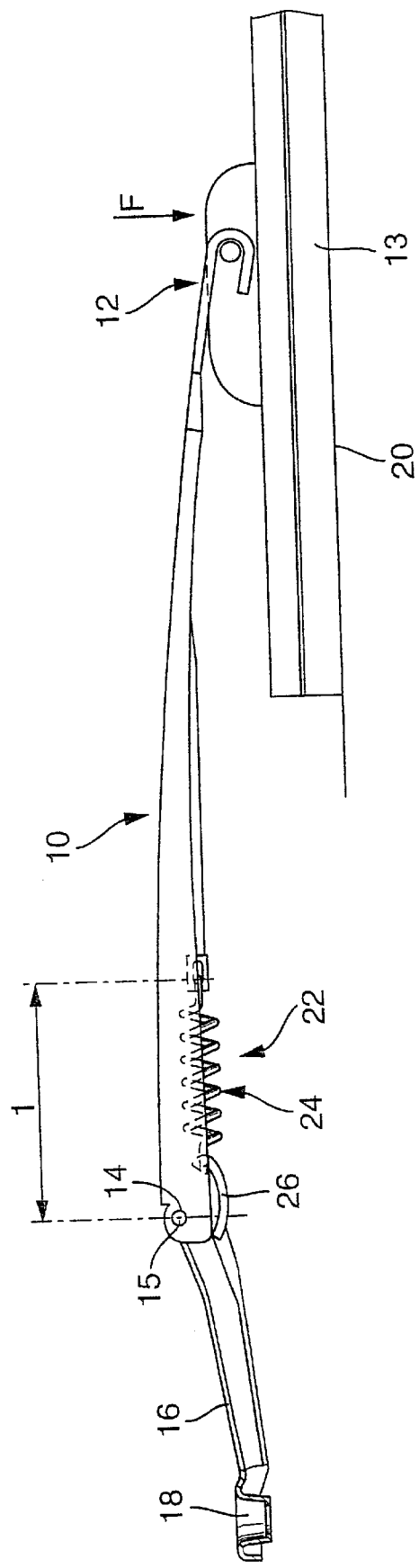
FIG. 1a shows a wiper arm with wiper blade and a rotary head of a wiper apparatus according to the invention.

FIG. 1a shows a wiper arm 10 of a wiper apparatus according to the invention. It comprises two ends, with a wiper blade 13 attached to one end 12. At the other end 14, the wiper arm 10 is hinge-mounted to a rotary head 16 in pivoting fashion using a hinge bolt 15. On its end opposite to the wiper arm 10, the rotary head 16 comprises a container liner 18 for attachment to a drive shaft (not shown) of the wiper apparatus. The wiper blade 13, which contacts a wiped surface 20, is hinge-mounted on one end 12 of the wiper arm 10. If the wiper apparatus is installed in a motor vehicle, the wiped surface is the windshield or rear window of the vehicle.

A tensioning element 22 is attached to the other end 14 of the wiper arm 10 on the side of the wiper arm 10 facing the wiped surface 20. It comprises an extension spring 24 and a hook 26, each of which is hooked in place under pretension on the side of the wiper arm 10 and the rotary head 16 facing the wiped surface 20. By loading the tensioning element 22, the wiper arm 10 is pressed with the force F in the direction of the wiped surface 20 with its one end 12 around its hinge bolt 15.

Figure 1B:
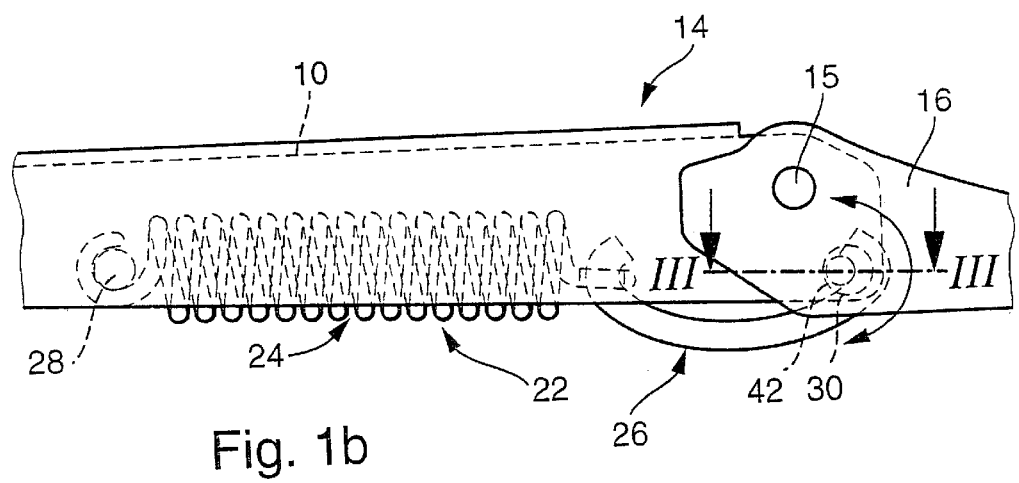
FIG. 1b shows a schematic detailed view of the tensioning element hooked in place.

The other end of the wiper arm 10 is shown in detail in FIG. 1b with the tensioning element 22. The extension spring 24 of the tensioning element 22 is hooked around a transverse bolt 28 between the two flanks of the U-shaped cross-section of the wiper arm 10. The transverse bolt 28 extends through the U-shaped cross-section of the wiper arm 10 at a distance A from the hinge bolt 15. On its other side, the extension spring 24 hooks into the hook 26 which, in turn, is hooked around an eccentric bolt 30 as the calibrating element. As a result, a torque acts on the wiper arm 10 around the hinge bolt. The eccentric bolt 30 thereby sits completely inside a bore 42 of the rotary head 16. The load on the extension spring 24 can be changed in this fashion by turning the eccentric bolt 30. This changes the contact force F with which the one end 12 of the wiper arm presses the wiper blade 13 against the wiped surface 20.

Figure 2:
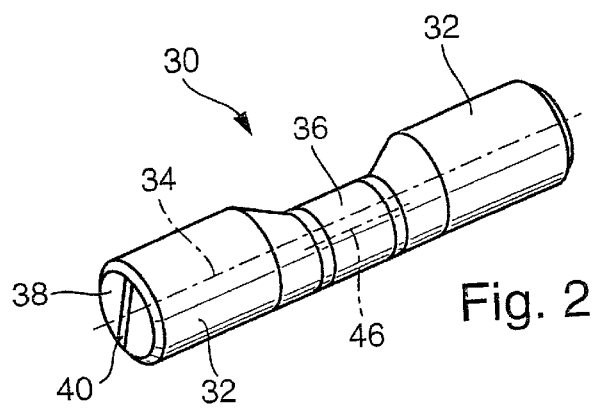
FIG. 2 shows a perspective drawing of an eccentric bolt.

The eccentric bolt 30 is shown in detail in FIG. 2. It basically comprises three cylindrical sections, whereby the two outer sections 32 extending along its longitudinal extension comprise a coaxial centerline 34. The centerline of the center section 36 is different from the coaxial centerline 34, in particular, axis-parallel to the coaxial centerline 34.

The radius of the center section 36 is always smaller or equal to the difference between the radius of the outer sections 32 and the distance between the coaxial centerline 34 and the axis-parallel centerline 46. In other words, the center section 36 in cross-section is always within the circle defined by the outer sections 32 in cross-section. Otherwise, it would not be possible to insert the eccentric bolt 30 into the bore 42.

On at least one of its end surfaces 38, the eccentric bolt 30 comprises a slit 40 that allows the eccentric bolt 30 to be turned within the bore 42 of the rotary head 16. It is also possible, of course, to locate a cross recession or a square socket or external square on the end surface 38 so that calibration can be carried out using commercially-available tools. If the eccentric bolt 30 is inserted in the bore 42 of the rotary head 16, the contact force F or the load of the tensioning element 22 can be adjusted by turning the eccentric bolt 30, then the eccentric bolt can be secured against rotation by means of riveting, stamping, pressing or welding.

To prevent the eccentric bolt 30 from falling through during installation, the two outer sections 32 can also have different radii.

Figures 3A, 3B:
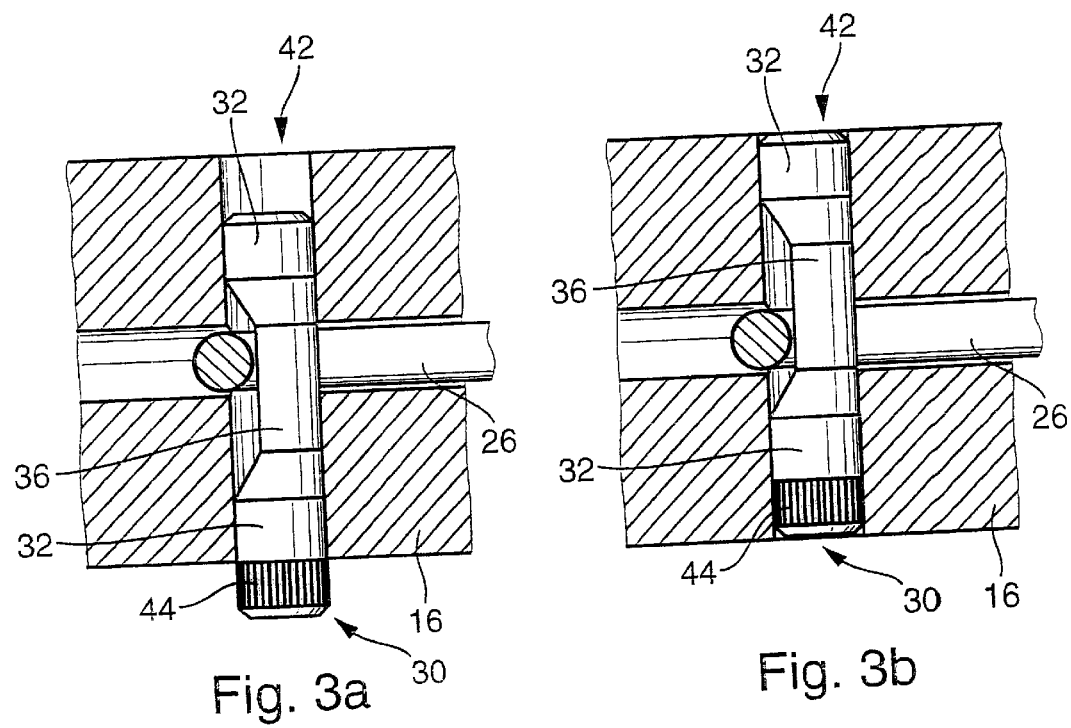
FIG. 3a shows schematic sectional view of an eccentric bolt with straight knurling during installation.
FIG. 3b shows an eccentric bolt as in FIG. 3a, after locking.

A sectional view through a rotary head 16 in the region of the eccentric bolt 30 is shown in FIG. 3. The eccentric bolt thereby comprises a straight knurling 44, as a fastening element, on one of its outer sections 32 on the side opposite to the center section 36. The center section 36 is dimensioned with regard for its longitudinal extension so that the hook 26 of the tensioning element 22 can be hooked around the center section 36 without the straight knurling 44 being in contact with the bore 42. In this fashion, the contact force F can be calibrated, and, at the end of the calibration procedure, the eccentric bolt 30 can be pressed into the bore and thereby locked, so that a positive connection between the bore 42 and straight knurling 44 prevents the eccentric bolt 30 from turning. This is illustrated in FIG. 3b.

The method—based on the invention—according to claim 11 can be carried out using an eccentric bolt 30 shown in FIG. 3. The eccentric bolt 30 thereby comprises a straight knurling 44 along part of its longitudinal extension, as the fastening element.

In the first step, the eccentric bolt 30 is inserted in the bore 42, but only so far that the straight knurling 44 is not yet lowered into the bore 42. The center section of the eccentric bolt 30 is so wide that this partial insertion alone is sufficient to hook the hook 26 of the tensioning element 22 around the eccentric bolt.

In a second step, the contact force F is adjusted by turning the eccentric bolt 30. In a third step, the eccentric bolt 30 is pressed into the bore 42 so that the straight knurling 44 brings about a positive or non-positive connection with the bore 42.

Of course, a polygon, a single cam, or the like can also be used instead of the straight knurling 44 as the fastening element.

In a variation of the invention, a bolt can be used instead of the eccentric bolt 30 that comprises a penetrating screw element in the center region along its longitudinal extension. If this is in contact with the hook 26 by way of its side opposite to the head, the head of the screw element can be turned, thereby increasing the spring preload, to perform calibration.

What is claimed is:

1. Wiper apparatus, in particular, for a motor vehicle, having a wiper arm (10) that is connectable to a wiper blade (13) on its one end (12) and, at a distance (A) from its other end (14), is connected to a tensioning element (22) that presses the one end (12) of the wiper arm (10) in the direction of a wiped surface (20) using a force F, wherein a calibrating element, is provided to adjust the Force F, wherein the tensioning element comprises at least one extension spring and wherein the calibrating element is an eccentric bolt.

2. Wiper apparatus according to claim 1, wherein the wiper arm (10) is connected at its other end (14) in pivoting fashion to a swivel head (16), and the tensioning element (22) is loaded between the wiper arm (10) and swivel head (16).

3. Wiper apparatus according to claim 1, wherein the tensioning element (22) is hooked around the calibrating element (30) at the swivel head (16).

4. Wiper apparatus according to claim 1, wherein the tensioning element (22) is hooked around the calibrating element (30) by means of a hook (26).

5. Wiper apparatus according to claim 1, wherein the calibrating element (30) comprises a straight knurling (44) for the purpose of fixation.

6. Wiper apparatus according to claim 1, wherein the calibrating element (30) comprises a square socket or external square, a slit (40), or a cross recession on its end surface for the purpose of calibration.

7. Wiper apparatus according to claim 1, wherein the calibrating element (30) is secured against rotation, especially by means of riveting, stamping, pressing or welding.

8. Wiper apparatus according to claim 1, wherein the calibrating element comprises three cylindrical sections (32, 26), whereby two outer sections (32) along the longitudinal extension comprise a coaxial centerline (34), and a center section (36) comprises an axis-parallel centerline (46) that differs from the coaxial centerline (34).

9. Wiper apparatus according to claim 8, wherein the two outer sections (32) have different diameters.

10. Wiper apparatus according to claim 8, wherein the eccentric bolt (30) is insertable into a bore (42) of swivel head, comprises a partial straight knurling (44), particularly in the axial direction, along one of the two outer sections (32) for locking purposes, and its center section (36) is designed so that the tensioning element (22) is able to be calibrated without the straight knurling (44) and bore (42) being in contact.

11. Method for adjusting a contact force of a wiper arm (10) of a wiper apparatus, said arm including a tensioning element therein coupled to an eccentric bolt, said method comprising at least the following steps:

partial insertion of the eccentric bolt (30) comprising—at least partially—a fastening element, in particular a straight knurling (44), along its longitudinal extension, into a bore (42) in the wiper arm leaving essential sections of said fastening element outside said bore, adjustment of the contact force at least by means of turning said bolt, pressing of the eccentric bolt (30) inward at least so far that said essential sections of the fastening element (44) are located within the bore (42).

* * * * *